US012782516B2

(12) United States Patent
Kiehn et al.

(10) Patent No.: US 12,782,516 B2
(45) Date of Patent: *Nov. 3, 2026

(54) METHOD AND DEVICE FOR OPTICALLY MEASURING DISTANCES

(71) Applicant: Microvision, Inc., Redmond, WA (US)

(72) Inventors: Michael Kiehn, Hamburg (DE); Michael Köhler, Hamburg (DE)

(73) Assignee: Microvision, Inc., Redmond, WA (US)

( * ) Notice: Subject to any disclaimer, the term of this patent is extended or adjusted under 35 U.S.C. 154(b) by 1327 days.

This patent is subject to a terminal disclaimer.

(21) Appl. No.: 17/577,903

(22) Filed: Jan. 18, 2022

(65) Prior Publication Data

US 2022/0137189 A1 May 5, 2022

Related U.S. Application Data

(63) Continuation of application No. 15/976,432, filed on May 10, 2018, now Pat. No. 11,262,438, which is a continuation of application No. PCT/EP2016/077499, filed on Nov. 11, 2016.

(30) Foreign Application Priority Data

Nov. 11, 2015 (EP) .................................... 15194125
Apr. 1, 2016 (EP) .................................... 16163529

(51) Int. Cl.

| | |
|---|---|
| ***G01C 3/08*** | (2006.01) |
| ***G01S 7/481*** | (2006.01) |
| ***G01S 7/484*** | (2006.01) |
| ***G01S 7/4863*** | (2020.01) |
| ***G01S 17/10*** | (2020.01) |
| ***G01S 17/42*** | (2006.01) |

(52) U.S. Cl.

CPC ............ *G01S 7/4815* (2013.01); *G01S 7/484* (2013.01); *G01S 7/4863* (2013.01); *G01S 17/10* (2013.01); *G01S 17/42* (2013.01)

(58) Field of Classification Search

CPC ...... G01S 7/4815; G01S 7/484; G01S 7/4863; G01S 17/10; G01S 17/42; G01S 17/894

See application file for complete search history.

(56) References Cited

U.S. PATENT DOCUMENTS 8,107,057 B2 1/2012 Audier et al.
2006/0132752 A1 6/2006 Kane
2007/0024840 A1 2/2007 Fetzer et al.
(Continued)

FOREIGN PATENT DOCUMENTS

CN 104035097 A 9/2014
DE 19717399 A1 6/1999
(Continued)

OTHER PUBLICATIONS

International Search Report (English translation) mailed Feb. 14, 2017, for corresponding international application PCT/EP2016/077499.

*Primary Examiner* — Samantha K Nickerson
(74) *Attorney, Agent, or Firm* — Kevin D. Wills

(57) ABSTRACT

An improved method for optical distance measurement is provided, in which only subsets of the transmitting elements of the transmission matrix are activated when using a transmission matrix to transmit measuring pulses and a reception matrix for receiving the latter.

28 Claims, 4 Drawing Sheets

(56) References Cited

U.S. PATENT DOCUMENTS

| | | | |
|---|---|---|---|
| 2009/0185159 A1 | 7/2009 | Rohner et al. | |
| 2010/0020306 A1 | 1/2010 | Hall | |
| 2011/0216304 A1 | 9/2011 | Hall | |
| 2012/0033196 A1 | 2/2012 | Vanek et al. | |
| 2012/0262696 A1 | 10/2012 | Eisele et al. | |
| 2013/0112667 A1* | 5/2013 | Holmgren | B23K 26/0006 219/121.6 |
| 2015/0042793 A1* | 2/2015 | Belenkii | G01S 3/7867 348/143 |
| 2015/0219764 A1 | 8/2015 | Lipson | |
| 2015/0256767 A1 | 9/2015 | Schlechter | |
| 2015/0260830 A1 | 9/2015 | Ghosh et al. | |
| 2016/0054434 A1* | 2/2016 | Williams | G01S 7/4865 356/5.01 |
| 2016/0274219 A1 | 9/2016 | Uyeno et al. | |

FOREIGN PATENT DOCUMENTS

| | | | | |
|---|---|---|---|---|
| DE | 102010006943 | A1 * | 8/2011 | G01S 17/10 |
| EP | 2388615 | A1 | 11/2011 | |
| EP | 2708913 | A1 | 3/2014 | |
| JP | S646716 | A | 1/1989 | |

* cited by examiner

METHOD AND DEVICE FOR OPTICALLY MEASURING DISTANCES

CROSS-REFERENCE TO RELATED APPLICATIONS

This is a continuation of U.S. patent application Ser. No. 15/976,432, filed May 10, 2018, which is a continuation application under 35 USC 120 from International Application PCT/EP2016/077499, filed Nov. 11, 2016, which claims priority from European Patent Application 15194125.9, filed Nov. 11, 2015 and European Patent Application 16163529.7, filed Apr. 1, 2016, the contents of each of which are incorporated herein by reference.

TECHNICAL AREA

The invention relates to a method as well as to a device for optical distance measurement.

BACKGROUND

Optical distance measurements, in particular for use in the driverless navigation of vehicles, are based on the time of flight principle. Use is most often made of a scanning sensor, preferably of a LIDAR (abbreviation for "light detection and ranging") sensor, which periodically sends out pulses. The pulses are reflected by objects, wherein the reflected pulses are detected. By determining the duration of pulses from the sensor to objects and back, the distance to these objects can be inferred drawing upon the speed of light. In particular, use is made of 3D LIDAR sensors, for which two different methods for distance measurement are known from prior art:

On the one hand, there are scanning LIDAR sensors which as a rule are based on a mechanical scanning, i.e., a rotational movement or oscillation of the LIDAR sensor or a component thereof. For example, EP 2 388 615 A1 describes an example for such a scanning LIDAR sensor, in which the field of view of the transmitter and receiver is mechanically diverted.

The disadvantage to scanning LIDAR sensors known from prior art is that scanning is always associated with a movement of mechanical parts. These movable parts are predominantly relatively large rotation mirrors or even larger parts, for example the scanning head, of the sensor, for which the overall moved mass is very large. For this reason, the scanning mechanism in this type of LIDAR sensor contributes significantly to the size and costs of the sensor, since apart from the moved parts, space must also be available for the corresponding electronics for actuating the electronics assembly.

Another type of 3D LIDAR sensor involves Flash LIDAR sensors, in which the entire field of view is illuminated at the same time. However, this requires very high pulse powers, typically several kW, so that a technically sensible range can be achieved in a large field of view. Because the entire field of view is always evaluated on the receiver side during the measuring window, the Flash LIDAR sensors known from prior art are extremely susceptible to outside disturbances. This applies to targeted attacks as well as inadvertent disturbances caused by the same type of sensors in other vehicles, which are oncoming or viewing the same scene. Precisely in the area of autonomous driving, i.e., the driverless navigation of a vehicle, such a lack of robustness against targeted or inadvertent disturbance sources is unacceptable, especially from a safety standpoint.

SUMMARY OF THE INVENTION

An object of the invention is to improve a distance measurement method in such a way as to eliminate the need for movable parts. In addition, the method is to be as robust as possible against interference pulses. A further object is to provide a corresponding distance measurement device that does not rely on movable parts for scanning, and is also designed with an elevated robustness against interference pulses.

The aforementioned objects may be achieved by the optical distance measurement method disclosed herein, in which a plurality of measuring pulses is transmitted by at least one transmission matrix with several transmitting elements. At least one transmitted measuring pulse is reflected by a measuring object in the form of a reflected measuring pulse, which is received by at least one reception matrix with several receiving elements. The measuring pulse reflected by the measuring object is a measuring pulse that was transmitted previously, the only difference being that its propagation direction has been changed by its reflection on the measuring object. The reflected measuring pulse can thus be understood as an echo of the transmitted measuring pulse. The duration of the at least one measuring pulse to the measuring object and back is ascertained, and used to determine the distance covered by the measuring pulse to the measuring object based on the speed of light. It is also possible for a measuring pulse to sequentially hit several measuring objects that lie one after the other and are only partially covered, so that a measuring pulse generates several echoes, i.e., several reflected pulses.

The transmission matrix comprises a first subset of the transmitting elements, and a second subset of the transmitting elements, each comprising at least one transmitting element, wherein the transmitting elements of the transmission matrix are activated and/or deactivated in such a way that exclusively the first subset of the transmitting elements is active at a first time, so that exclusively the at least one transmitting element allocated to the first subset of transmitting elements transmits a measuring pulse, and wherein exclusively the second subset of transmitting elements is active at a second time, so that exclusively the at least one transmitting element allocated to the second subset of transmitting elements transmits a measuring pulse.

An optical distance measurement is characterized in that distances are determined using optical signals, in particular optical measuring pulses. The term "distance" is to be understood as a space. The distance covered by the measuring pulse is to be understood as the stretch between the transmitting element that transmitted the measuring pulses and the measuring object plus the stretch between the measuring object and the receiving element of the reception matrix that received the corresponding reflected measuring pulses. In particular, the method involves considering the exact position of the transmitting element and receiving element, in particular in relation to each other. Since the measuring object is typically a three-dimensional object, so that several areas of the measuring object could be closer and other areas of the measuring object further away, the term "distance to the measuring object" denotes the distance to at least one location of the measuring object, specifically the location that a measuring pulse struck and was reflected from. The duration is to be understood as the time that the measuring pulse required for the mentioned distance. In particular, the measuring object is located in the field of vision on the transmitter side and/or receiver side.

The measuring pulse is an optical signal, in particular an electromagnetic signal. The measuring pulse is advantageously a light pulse, i.e., a pulse with a wavelength inside of the part of the electromagnetic spectrum visible to the human eye. A measuring pulse preferably has a pulse duration. A measuring pulse can thus be understood as a portion of electromagnetic radiation limited in time. Since a measuring pulse involves an electromagnetic signal, and thus the velocity of the pulse is known, what stretch the measuring pulse covered over the duration can be deduced from the duration of a measuring pulse drawing upon the speed of light.

In particular, a matrix is a two-dimensional arrangement of elements, here transmitting or receiving elements, or parts or surfaces thereof, in other words an arrangement in a plane. Involved in particular is a three-dimensional body, on which elements or parts or surfaces thereof are arranged in a two-dimensional plane. In a direction perpendicular to the plane, the matrix preferably also has an expansion. As a consequence, the matrix can in particular be viewed as a three-dimensional, in particular plate-shaped body, on whose one surface the transmitting or receiving elements are arranged. In particular, the elements themselves have a three-dimensional expansion, in other words an expansion not just in the plane, but also perpendicular thereto. The transmitting elements advantageously have an active surface for transmitting measuring pulses. This is to be understood above all as the surface of the transmitting element at which a measuring pulse leaves the element. The receiving elements also have above all an active surface for receiving the measuring pulses. This is above all the surface on which a measuring pulse is detected. Precisely these active surfaces of the transmitting and/or receiving element are advantageously arranged in a flat plane via the matrix.

The transmitting elements are arranged in a first plane of the transmission matrix, and the receiving elements in a second plane of the reception matrix. The first and second planes are here advantageously designed parallel to each other.

In particular, the transmitting elements on the transmission matrix and/or the receiving elements on the reception matrix do not directly adjoin each other. It is advantageous that the transmitting elements be uniformly arranged on the transmission matrix and/or the receiving elements on the reception matrix, in particular in a uniform grid form.

In particular, the arrangement of elements on the matrix can be divided into columns and/or rows, wherein the columns and/or rows most preferably have a constant column spacing or row spacing. In particular, the column spacing and row spacing are identical. In an especially preferred embodiment, the rows of the transmission matrix and/or reception matrix are each offset by half a column spacing.

The elements of a column and/or a row advantageously are spaced a constant distance apart from each other. A column most advantageously has an element in each row of the matrix, while in particular a row has one element in each column of the matrix. If one were to imagine a straight line being drawn through each row as well as through each column, in particular through the respective midpoints of the elements of each row and column of the matrix, the lines of the rows would most preferably all be parallel to each other. The straight lines of the columns would most advantageously also be arranged parallel to each other. The straight lines of the columns and the straight lines of the rows would here most preferably essentially intersect each other at a right angle. The distance between adjacent straight lines of the columns would correspond to the column spacing, and the distance between adjacent straight lines of the rows would correspond to the row spacing. As an alternative to a uniform configuration, the distances between the elements on the transmission matrix and/or reception matrix could vary. In particular, the distance in the central area of the matrix can be differently configured than in the edge areas of the matrix, so that varying angular resolutions arise in these areas.

In particular, a transmitting element of the transmission matrix is a laser, in particular a pulsed laser, so that the transmission matrix comprises a plurality of lasers.

The transmitting elements are advantageously arranged in such a way that the measuring pulses of various transmitting elements are transmitted in directions essentially parallel to each other. The term "essentially" is intended above all to consider a divergence in transmitting elements, and hence a slight deviation from a parallel transmission.

The transmitting elements of the transmission matrix form a set of transmitting elements. A subset is to be understood as a proper subset of the set of transmitting elements, so that the subset is smaller than the set of transmitting elements of the transmission matrix. In particular, the first subset is different from the second subset, wherein they advantageously do not intersect. No transmitting element of the first subset is thus part of the second subset, and vice versa.

The transmitting elements of the transmission matrix are activated and/or deactivated in such a way that exclusively the first subset of transmitting elements is active at a first time. During activity, the transmitting elements of the first subset here each periodically transmit at least one measuring pulse, in particular respective several measuring pulses. Furthermore, the transmission can likewise be aperiodic, e.g., based upon pseudo-random sequences. At a second time, exclusively the second subset of transmitting elements is active, so that exclusively the at least one transmitting element allocated to the second subset of transmitting elements periodically transmits a measuring pulse, in particular several measuring pulses. The first time differs from the second time, with the second time in particular following the first time. The first and/or second subset advantageously comprises a plurality of transmitting elements, which during activity each simultaneously transmit at least one or several measuring pulses. Above all elements active immediately before the first time, but do not belong to the subset to be activated, are deactivated.

Simultaneously activating only subsets of transmitting elements makes it possible to specifically illuminate partial areas of the field of vision. Because the first and second subsets differ, the measuring pulses of the first subset illuminate a different, in particular spatially correlated, partial area of the field of vision than the measuring pulse of the second subset. The term illumination must be taken to mean that measuring pulses are transmitted in a specific part of the field of vision, and received from the latter. By activating various subsets one after the other in chronological sequence, the field of vision can be scanned without the necessity of using any movable parts. The term "scanning" must be understood as a scanning of the field of vision.

A single transmission matrix and/or reception matrix is advantageously used. As an alternative, several transmission matrices and/or reception matrices can be used, wherein the transmission matrices all preferably lie in the first plane and/or the reception matrices advantageously all preferably lie in the second plane, wherein the first and second planes differ.

The first and/or second subset can further comprise only one transmitting element. Preferably one, in particular precisely one, transmitting pixel is allocated to each transmitting element. In this way, the first and/or second subset can comprise only one transmitting pixel, so that pixel-by-pixel scanning can take place.

The method further involves the conversion of various positions of transmitting elements on the transmission matrix by means of at least one optical transmission system into different transmission angles, so that an angle scan can take place. In particular, at least part of the transmitting elements, preferably all transmitting elements, are arranged in the focal plane of at least one optical transmission system for this purpose.

Only a single optical transmission system can here be used, or various optical transmission systems with preferably the same focal plane can be allocated to different subsets, in particular submatrices and/or columns and/or rows, of the transmitting elements of the transmission matrix. The subsets are advantageously the same size. In such a case, the transmission matrix is divided into various, preferably correlated areas, in particular submatrices, which each receive their own optical transmission system. The submatrices preferably have the same, in particular quadratic shape, but can also have different shapes. It is even possible to allocate a separate optical transmission system to each transmitting element. Even when several transmission matrices are used, it is advantageous to allocate a separate optical transmission system to each matrix. In particular, the subsets having allocated to them a separate optical transmission system do not have to, but can, involve the subsets of the transmission matrix that are activated simultaneously.

The transmitting elements grouped behind an optical transmission system can be spatially separated from the other transmitting elements grouped behind an optical transmission system, i.e., the set of transmitting elements allocated to an optical transmission system or the corresponding pixels need not be located on a semiconductor chip. As a result, the chips to be manufactured can be smaller, and the system becomes more configurable.

Using several transmission matrices with their own optical transmission systems or dividing the transmission matrix into several submatrices with single optical systems permits the construction of different device variants. The number of transmitting elements makes it possible to easily scale the power transmitted into the scene, and hence the range of the sensor.

The at least one optical transmission system is used to transmit the measuring pulses at different angles. The at least one optical transmission system above all is a wide-angle lens.

The transmission matrix advantageously is a "focal plane array", i.e., a two-dimensional arrangement of transmitting elements in the focal plane of an optical transmission system. The focal plane of the at least one optical transmission system determines the field of vision of the transmitter, in other words the transmitting-side optical system, above all the optical transmission system, according to the expansions of the transmission matrix.

By placing the transmission matrix or parts thereof in the focal plane of the optical transmission system, the position of the individual transmitting elements or pixels of the matrix is converted into an angle by the optical system. In other words, the measuring pulses hitting the optical transmission system, preferably running in parallel directions, are deflected by the optical transmission system at different angles, so that a large field of vision can be illuminated, without movable parts being necessary for deflecting or receiving the measuring pulses.

Addressing various subsets of the transmitting elements yields an angle scan. No additional components are required for scanning. As a result, the costs of a LIDAR sensor and the size can be significantly reduced. Furthermore, the sequence in which the measurements of a scan are recorded can be freely determined or even changed during operation. This produces a higher robustness against outside influences. In addition, this allows dynamic focusing on specific areas of the field of vision.

The receiving elements of the reception matrix are above all photosensitive surfaces, which receive measuring pulses reflected on measuring objects, and in particular can detect them. In particular, the method further involves a step of imaging the reflected measuring pulses from various angles onto the at least one reception matrix. To this end, use is made in particular of at least one receiving optical system, in whose focal plane the reception matrix is advantageously also placed.

With regard to the number of used reception matrices and/or receiving optical systems, along with the allocation of receiving optical systems to the reception matrices or areas of a reception matrix, the above description about the transmission matrix and transmitting optical system preferably applies.

The at least one receiving optical system above all is a wide-angle lens, while the reception matrix advantageously has the form of a "focal plane array", i.e., a two-dimensional arrangement of receiving elements in the focal plane of a receiving optical system. The focal plane of the at least one receiving optical system determines the field of vison of the receiver, in other words the receiver-side optical system, above all the receiving optical system, according to the expansions of the reception matrix. Further, receiving pixels are preferably allocated to receiving elements of the reception matrix. Preferably one, and in particular precisely one, receiving pixel is allocated to each receiving element.

The focal length of the transmitting optical system, the dimensions of the pixels in the transmission matrix as well as the dimensions of the entire transmission matrix are set so as to adjust the illumination pattern to the field of vision used on the receiver side and its pixels. On the other side, the arrangement of the reception matrix and receiving optical system is adjusted to the illumination pattern generated on the transmitter side.

The photosensitive surfaces are preferably avalanche photodetectors, in particular single photon avalanche detectors, which in particular are operated with a bias voltage above their breakdown voltage. As a consequence, these detectors operate in the so-called Geiger mode, so that an individual photon can trigger the avalanche breakdown. As an alternative, other detectors can likewise be used without utilizing an avalanche breakdown, e.g., pin diodes.

The method preferably involves a method for longitudinally and transversely controlling a vehicle, in particular an automobile, based on detected objects or free spaces, wherein the vehicle in particular is controlled autonomously, i.e., a driverless movement of the vehicle is enabled. This is used for the planning of paths and movement along these paths by the vehicle. The term "measuring object" can be understood as additional markings that are provided for controlling the vehicle and serve this purpose exclusively. In addition, measuring objects can represent environmental features that are located in the environment and whose positions are used for controlling the vehicle. These include for example trees, curbs, road markings or other road users.

In such a case, use is typically not made of any additional markings arranged exclusively for control purposes. The method preferably relates to a method for navigating the vehicle.

The first subset of transmitting elements preferably has allocated to it a first subset of receiving elements, and the second subset of transmitting elements a second subset of receiving elements, each comprising at least one receiving element. In particular, each transmitting element of the transmission matrix has allocated to it a receiving element of the reception matrix. Each transmitting element advantageously has allocated to it precisely one receiving element, so that the allocation is unambiguous. In particular, the transmitting elements and receiving elements allocated to each other are located at similar, in particular identical, points on the transmission matrix or reception matrix.

The first and/or second subset of the receiving elements comprises at least one, preferably several, receiving elements. Similarly to the transmission matrix, the receiving elements of the reception matrix form a set, with the first and/or second subset being a real subset.

The receiving elements are advantageously activated and/or deactivated in such a way that exclusively the first subset of receiving elements is active essentially at the same time the first subset of transmitting elements is activated, so that the first subset of receiving elements receives the measuring pulses transmitted and reflected by the first subset of transmitting elements, and that exclusively the second subset of receiving elements is active essentially at the same time the second subset of transmitting elements is activated, so that the second subset of receiving elements receives the measuring pulses transmitted and reflected by the second subset of transmitting elements.

Therefore, only those receiving elements allocated to the first or second subset of transmitting elements are activated. Essentially at the same time means that the subsets of receiving elements are activated either at the same time the corresponding subsets of transmitting elements are activated or at least simultaneously to the extent that measuring pulses transmitted by a subset of transmitting elements can be detected by the allocated subset of receiving elements. The maximum time difference between the activation of transmitting elements and corresponding receiving elements can thus never exceed the duration of the measuring window. The measuring window is derived from an assumed maximum permissible measuring distance, since no detectable reflections of objects are to be expected any longer once a specific distance has been exceeded. The duration of the measuring window is derived from the maximum permissible measuring distance and speed of light. Normally, the measurement is ended after the duration of the measuring window has expired. Providing a time difference between the activation of transmitting elements and activation of corresponding receiving elements can advantageously also be used to influence the coverage in terms of depth. For example, the receiving elements can only be activated after the measuring pulses have already covered a certain stretch, so that objects at close range are faded, since they would have already arrived at the receiving elements prior to their activation. For example, such a close-range object could be a dirty front sensor panel.

In particular, the unrequired, since unilluminated, receiving elements or pixels of the reception matrix are deactivated. For example, this is done in avalanche photodetectors by lowering the bias voltage.

The first subset and/or second subset of the transmitting elements and/or receiving elements advantageously form a spatially coherent area of the transmission matrix or reception matrix. In particular, the transmitting elements and/or receiving elements of the first and/or second subset are arranged adjacent to each other. In particular, the measuring pulses of the first and/or second subset of transmitting elements are transmitted in similar directions by means of the optical transmission system. The transmitting elements of the first and/or second subset advantageously illuminate a spatially coherent area of the field of vision.

Further, the first subset and/or second subset of the transmitting elements and/or receiving elements consists of at least one row and/or at least one column of the transmission matrix or reception matrix. In addition, the subsets can be any submatrices of the transmission matrix or reception matrix. In particular, the first subset and/or second subset of transmitting elements and/or receiving elements are configured spatially adjacent to each other.

After the first and second subsets of the transmitting elements and/or receiving elements, additional subsets of the transmission matrix and/or reception matrix are preferably activated, which in particular comprise a majority of the transmission matrix and/or reception matrix. The entire transmission matrix and/or reception matrix can advantageously be divided into a specific number of subsets, wherein each subset is activated at least once, preferably precisely once, during a scan of the field of vision. By actuating, in other words activating, this number of subsets, the entire field of vision can be scanned or illuminated. In particular, the subsets of transmitting elements and/or receiving elements are actuated in such a way that spatially coherent and adjacent areas of the transmission matrix and/or reception matrix are activated one after the other, so that in particular the field of vision is sequentially acquired along a scanning direction. The scanning direction here runs above all from one end of the transmission matrix and/or reception matrix to the opposite end of the latter.

For example, a horizontal scan can be performed, in which one column after the other—as subsets of transmitting elements and/or receiving elements—is sequentially activated or deactivated in ascending or descending order. Another example involves a vertical scan, in which the rows of the transmission matrix or reception matrix are analogously activated sequentially as subsets of transmitting elements and/or receiving elements. In another advantageous embodiment, the subsets are activated or deactivated not in ascending or descending order, but in a random sequence that can change from scan to scan. Furthermore, the subsets of transmitting elements and/or receiving elements are activated or deactivated in such a way as to not activate subsets that are adjacent to each other, but making it appear that the subsets are being activated in an at least apparently random sequence. This type of method is much more robust against interference pulses, since its scheme is difficult to comprehend from outside. The subsets are further activated and deactivated based on the results of preceding scans, so that areas of special interest can be monitored more closely.

The method further involves determining the times at which measuring pulses were received, in particular by means of at least one evaluation unit. In particular, a respective evaluation unit is allocated to subsets, in particular submatrices and/or rows and/or columns, of the receiving elements of the reception matrix. The subsets having an evaluation unit allocated to them need not, but can, involve the subsets for receiving reflected measuring pulses, which are simultaneously activated. All receiving elements allocated to an evaluation unit are connected with it.

In addition, each receiving element can have allocated to it one, preferably precisely one, evaluation unit. The evaluation units are allocated in such a way that an evaluation unit is always allocated to a pixel of the active submatrix. As a consequence, the number of required evaluation units depends on the number of pixels active in a submatrix.

The receiving elements or pixels of the reception matrix are here linked to the evaluation units by way of a selection circuit, in particular a multiplexer, which ensures that only the active receiving elements or pixels are connected with the evaluation electronics.

A distance measuring device is also provided that comprises a transmission matrix with several transmitting elements for transmitting measuring pulses and a reception matrix with several receiving elements for receiving measuring pulses reflected on objects. The transmission matrix comprises a first subset of transmitting elements and a second subset of transmitting elements, which each comprise at least one, preferably several, transmitting elements. The transmitting elements of the transmission matrix are designed to be activated and/or deactivated in such a way that exclusively the first subset of transmitting elements is active at a first time, so that at least one transmitting element allocated to the first subset of transmitting elements transmits a measuring pulse, and wherein exclusively the second subset of transmitting elements is active at a second time, so that the at least one transmitting element allocated to the second subset of transmitting elements transmits a measuring pulse.

Preferably, the first subset of transmitting elements has allocated to it a first subset of receiving elements, and the second subset of transmitting elements a second subset of receiving elements, which each comprise a receiving element, preferably a plurality of receiving elements. In particular, the receiving elements are here designed to be activated and/or deactivated in such a way that exclusively the first subset of receiving elements is active essentially at the same time that the first subset of transmitting elements is activated, so that the first subset of receiving elements receives the measuring pulses transmitted and reflected by the first subset of transmitting elements, and wherein exclusively the second subset of receiving elements is active essentially at the same time the second subset of transmitting elements is activated, so that the second subset of receiving elements receives the measuring pulses transmitted and reflected by the second subset of transmitting elements.

The optical distance measuring device advantageously comprises at least one optical transmission system for transmitting the measuring pulses in different directions, wherein at least part of the transmitting elements, preferably all transmitting elements, of the transmission matrix are arranged in the focal plane of the at least one optical transmission system. In particular, the device further comprises at least one receiving optical system, in particular an imaging lens, to image the measuring pulses onto the reception matrix, wherein at least part of the receiving elements, preferably all receiving elements, of the reception matrix are advantageously arranged in the focal plane of the at least one receiving optical system. Precisely one transmitting optical system is preferably allocated to at least one part of the transmitting elements, preferably to all transmitting elements. It is further preferred that precisely one receiving optical system be allocated to at least one part of the receiving elements, preferably to all receiving elements. In addition, a microlens array can be arranged between the receiving optical system and receiving elements and/or between the transmitting optical system and transmitting elements, specifically in such a way that precisely one receiving or transmitting element is allocated to each microlens of the microlens array.

The focal length of the transmitting optical system, the dimensions of the pixels in the transmission matrix as well as the dimensions of the entire transmission matrix are set so as to adjust the illumination pattern to the field of vision used on the receiver side and its pixels. On the other side, the arrangement of the reception matrix and receiving optical system is adjusted to the illumination pattern generated on the transmitter side.

In an especially preferred further development, the device comprises a plurality of transmission matrices and/or reception matrices, wherein the matrices each have allocated to them a transmitting optical system or receiving optical system.

In particular, the device is a LIDAR sensor, further preferably a Flash LIDAR sensor. The Flash LIDAR sensor can be operated in both the "Flash" mode, so that the entire field of vision is illuminated simultaneously, and in a scan mode, specifically by sequentially activating subsets of the transmission matrix and/or reception matrix. The elements of the device are advantageously arranged in the direction of measuring pulse movement in such a way that the transmission matrix follows the transmitting optical system. After the distance to the measuring object has been covered, reflection on a measuring object has taken place, and the distance has been covered once again, the receiving optical system follows, and thereupon the reception matrix.

In particular, a transmitting pixel is allocated to each transmitting element, and a receiving pixel to each receiving element, wherein the transmitting pixels have a larger expansion than the receiving pixels. As an alternative, the transmitting pixels are smaller than the receiving pixels, or in other words the receiving pixels are larger than the transmitting pixels. This allows for tolerances during the manufacture of the transmission and reception matrix, as well as during the assembly and alignment of device components. In addition, optical system distortions can thereby be balanced out.

In particular, the device is designed for implementing the method described.

BRIEF DESCRIPTION OF THE DRAWINGS

Schematically shown on.

DETAILED DESCRIPTION OF EMBODIMENTS OF THE INVENTION

Figure 1A:
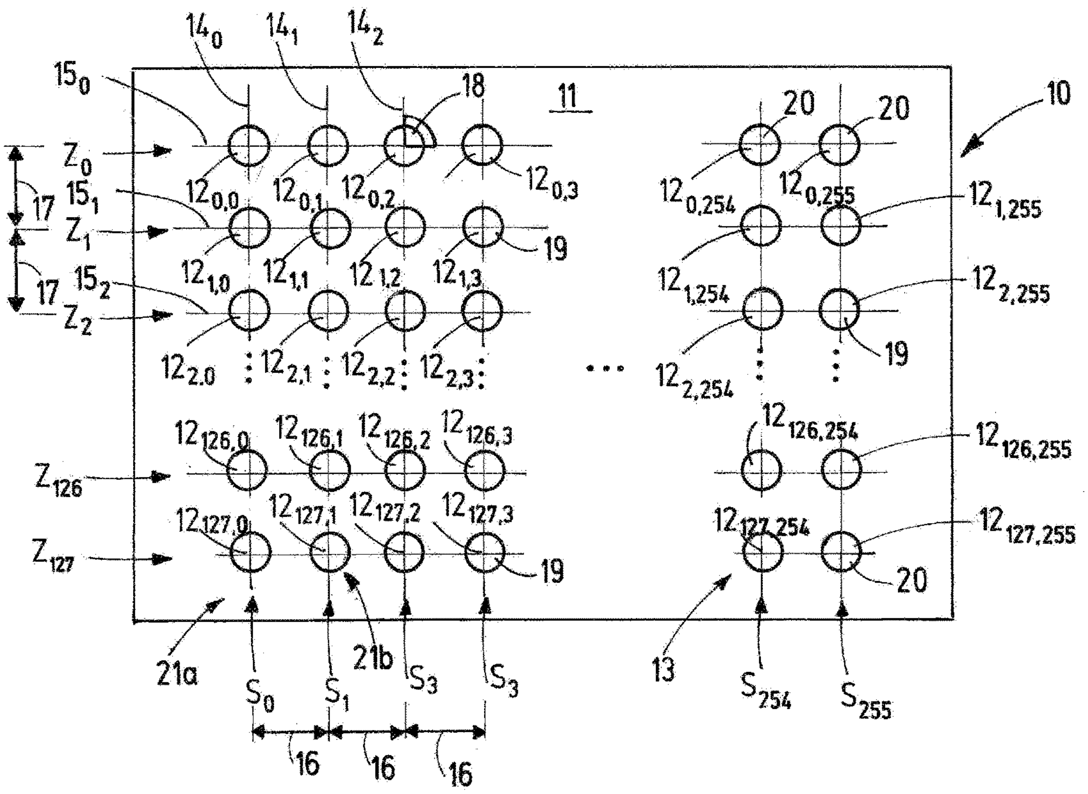
FIG. 1*a* is a top view of a transmission matrix of a device according to the invention.

FIG. 1*a* presents a top view of a transmission matrix (10) of a device according to the invention. FIG. 1*a* depicts one side (11) of the transmission matrix (10), on which transmission elements (12$_{0,0}$ to 12$_{127,255}$) are arranged in a regular pattern. The pattern involves a uniform grid form (13). The transmitting elements (12$_{0,0}$ to 12$_{127,255}$) can be divided into rows ($Z_0$ to $Z_{127}$) and columns ($S_0$ to $S_{255}$). The transmission matrix (10) consists of 128 rows and 256 columns of transmitting elements in all. The notation " . . . " on the figure denotes that additional elements of the matrix are present at this point that were not shown for the sake of clarity. In the subscripted digit in the numbering of transmitting elements (12$_{0,0}$ to 12$_{127,255}$), the first number denotes the row of the transmission matrix (10) in which a specific transmitting element is located, while the second number in the subscripted digit quantifies the column in which this transmitting element is arranged.

The transmitting elements (12$_{0,0}$ to 12$_{127,255}$) are formed by lasers (20), and are arranged in such a way that each column (e.g., $S_0$) comprises a transmitting element (in this example: 12$_{0,0}$, 12$_{1,0}$, 12$_{2,0}$ to 12$_{126,0}$, 12$_{127,0}$) of each row ($Z_0$ to $Z_{127}$), and that each row (e.g., $Z_0$) comprises a transmitting element (in this example: 12$_{0,0}$, 12$_{0,1}$, 12$_{2,0}$ to 12$_{254,0}$, 12$_{255,0}$) of each column ($S_0$ to $S_{255}$). The rows ($Z_0$ to $Z_{127}$) have a constant row spacing (17), while the columns ($S_0$ to $S_{255}$) have a constant column spacing (16). If imaginary lines are run through the midpoints of the transmitting elements of the columns (here for example 14$_0$ to 14$_2$) and through the midpoints of the transmitting elements of the rows (here for example 15$_0$ to 15$_2$), they have precisely this column spacing (16) or row spacing (17) to each other. Further, the imaginary lines (14$_0$ to 14$_2$) of the columns and the imaginary lines (15$_0$ to 15$_2$) of the rows meet at right angles (18). A transmitting pixel (19) is allocated to each transmitting element (12$_{0,0}$ to 12$_{127,255}$). The transmitting pixels (19) are identical in size.

Figure 1B:
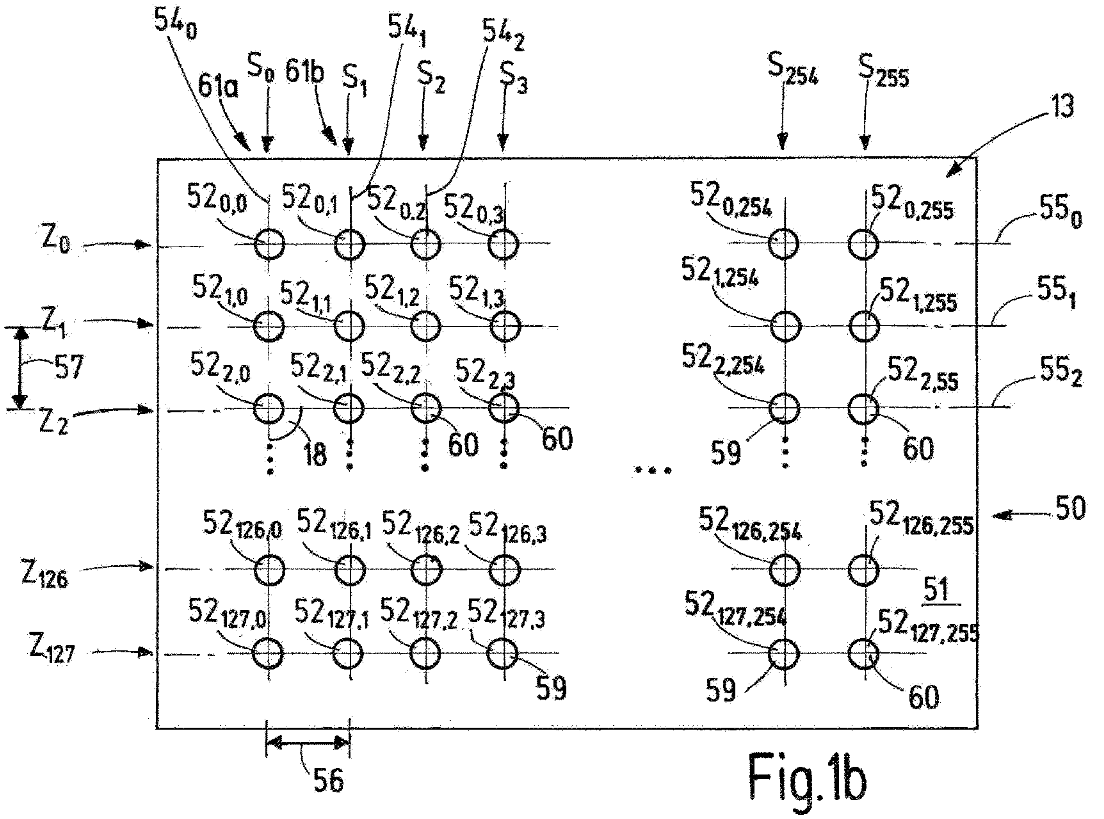
FIG. 1*b* is a top view of a reception matrix of the device according to the invention, comprising the transmission matrix according to FIG. 1.

FIG. 1*b* presents a top view of a side (51) of a reception matrix (50) of a device according to the invention with a plurality of receiving elements (52$_{0,0}$ to 52$_{127,255}$). A receiving element (52$_{0,0}$ to 52$_{127,255}$) of the reception matrix (50) is allocated to each transmitting element (12$_{0,0}$ to 12$_{127,255}$) of the transmission matrix (10). The receiving elements (52$_{0,0}$ to 52$_{127,255}$) are arranged in 256 columns ($S_0$ to $S_{255}$) and 128 rows ($Z_0$ to $Z_{127}$) in the form of a uniform grid form (13).

The receiving elements (52$_{0,0}$ to 52$_{127,255}$) are formed by single photo avalanche detectors (60), and just as the transmitting elements (12$_{0,0}$ to 12$_{127,255}$) are arranged in such a way that each column (e.g., $S_0$) comprises a receiving element (in this example: (52$_{0,0}$, 52$_{1,0}$, 52$_{2,0}$ to 52$_{126,0}$, 52$_{127,0}$) of each row ($Z_0$ to $Z_{127}$), and that each row (e.g., $Z_0$) comprises a receiving element (in this example: 52$_{0,0}$, 52$_{0,1}$, 52$_{0,2}$ to 52$_{0,254}$, 52$_{0,255}$) of each column ($S_0$ to $S_{255}$). The rows ($Z_0$ to $Z_{127}$) and columns ($S_0$ to $S_{255}$) have a constant spacing, the row spacing (57) or column spacing (56). Imaginary lines (here for example 54$_0$ to 54$_2$) through the midpoints of the receiving elements of the columns along with imaginary lines (here for example 55$_0$ to 55$_2$) through the midpoints of the receiving elements of the rows meet at a right angle (18). A receiving pixel (59) is allocated to each receiving element (52$_{0,0}$ to 52$_{127,255}$). The receiving pixels (59) are the same size, but smaller than the transmitting pixels (19).

Figure 2:
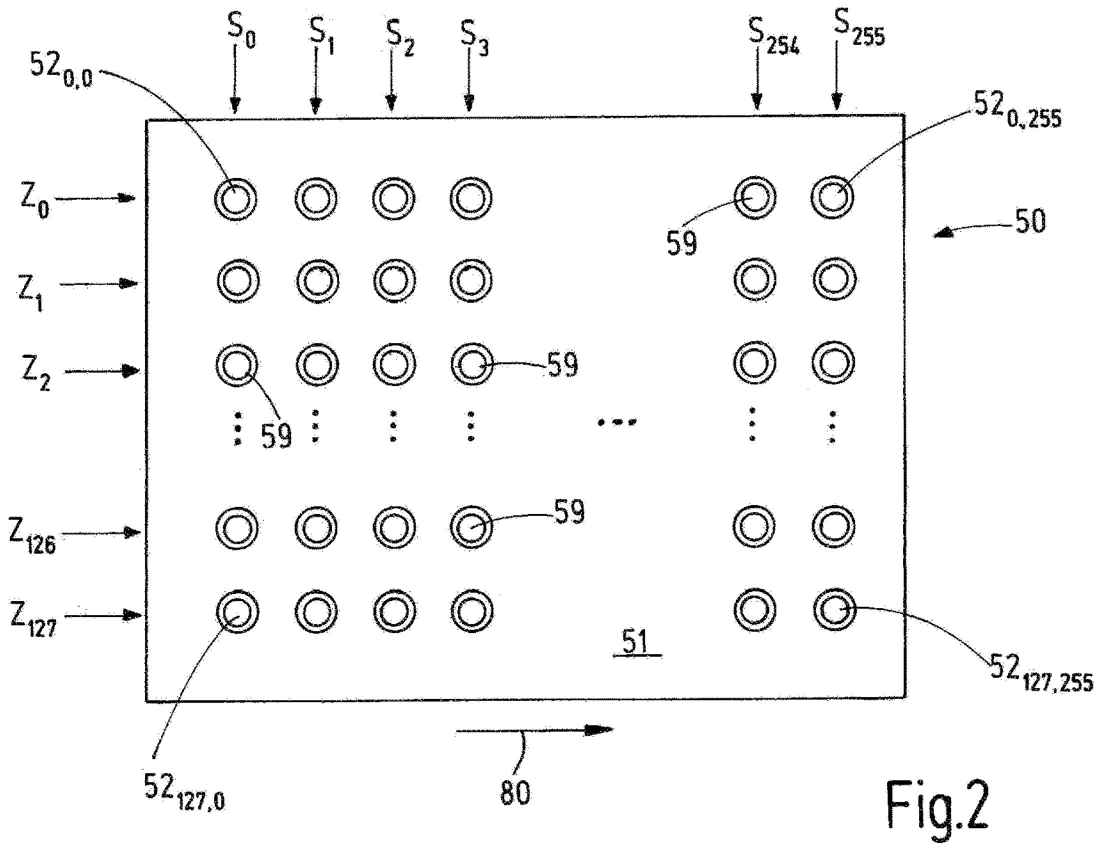
FIG. 2 is the overall illumination of the receiving elements of the reception matrix of a device according to the invention, comprising the transmission matrix and reception matrix according to FIGS. 1*a* and 1*b;*

FIG. 2 depicts the illumination of the reception matrix (50), more precisely the receiving elements (52$_{0,0}$ to 52$_{127,255}$) or receiving pixels (59) of the reception matrix (50), according to FIG. 1*b* by the transmission matrix (10), more precisely the transmitting elements (12$_{0,0}$ to 12$_{127,255}$) or transmitting pixels (19) of the transmission matrix (10) according to FIG. 1*a*. To this end, FIG. 2 presents a top view of the side (51) of the reception matrix (50). The overall illumination is shown, meaning the illumination that results when each transmitting element (12$_{0,0}$ to 12$_{127,255}$) of the transmission matrix (10) is active and transmits measuring pulses.

Figure 3:
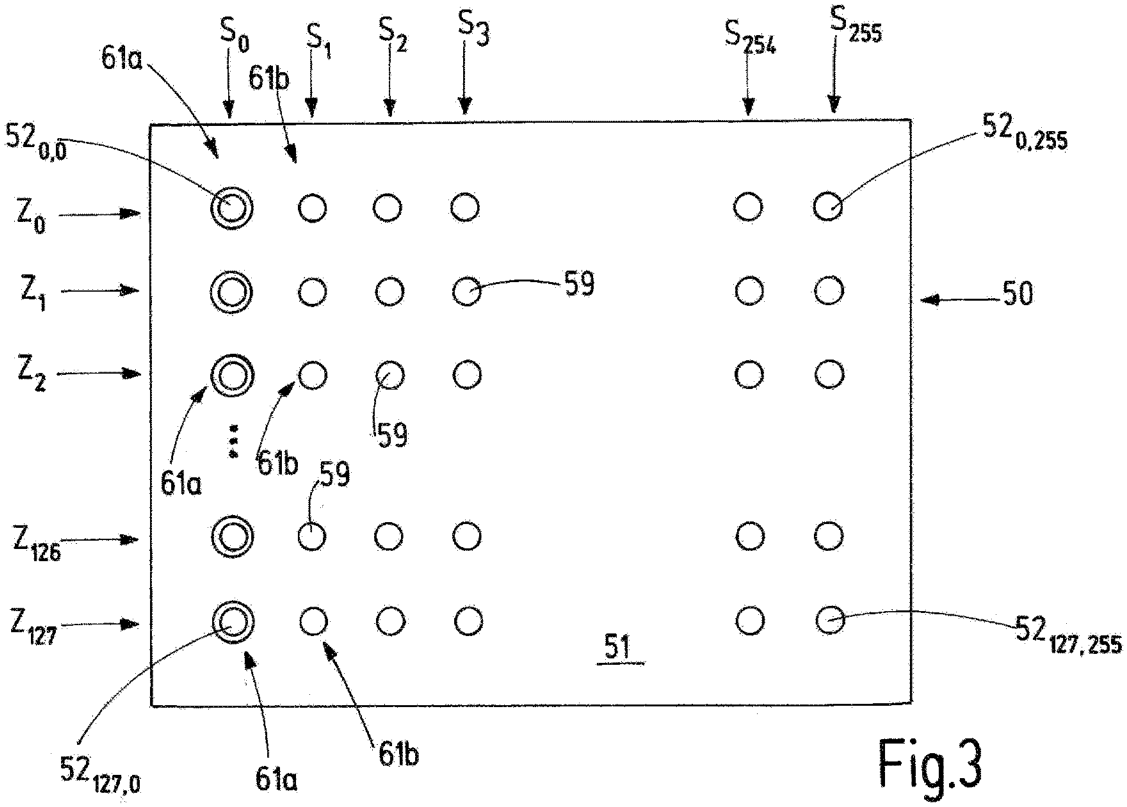
FIG. 3 is a partial illumination of the receiving elements of the reception matrix according to FIGS. 1*a* and 2 at a first time.

FIG. 3 shows a partial illumination of the reception matrix according to FIGS. 1*b* and 2 by the transmission matrix (10) according to FIG. 1*a*. To this end, the first column ($S_0$) of the transmission matrix (10) with transmitting elements (12$_{0,0}$, 12$_{1,0}$, 12$_{2,0}$ to 12$_{126,0}$, 12$_{127,0}$) forms a first subset (21*a*) of transmitting elements (12$_{0,0}$ to 12$_{127,255}$), while the first column ($S_0$) of the reception matrix (10) with receiving elements (52$_{0,0}$, 52$_{1,0}$, 52$_{2,0}$ to 52$_{126,0}$, 52$_{127,0}$) forms a first subset (61*a*) of receiving elements (52$_{0,0}$ to 52$_{127,255}$). The first subset (61*a*) of receiving elements (52$_{0,0}$ to 52$_{127,255}$) is allocated to the first subset (21*a*) of transmitting elements (12$_{0,0}$ to 12$_{127,255}$).

FIG. 3 shows the illumination at a first time, at which only the first subset (21*a*) of transmitting elements (12$_{0,0}$ to 12$_{127,255}$) as well as the corresponding first subset (61*a*) of receiving elements (52$_{0,0}$ to 52$_{127,255}$) are active. The remaining transmitting elements, more precisely the submatrix with elements (52$_{0,1}$ to 52$_{127,255}$) are deactivated, so that the receiving elements on FIG. 2 are depicted as unilluminated. After the first subsets (21*a*, 61*a*) of the transmission matrix (10) and reception matrix (50) have been activated, the second column ($S_1$) as the second subset (21*b*) of the transmission matrix (10) and the second column ($S_1$) as the second subset (61*b*) of the reception matrix (50) are activated according to the inventive method. In particular, the columns of the transmission matrix (10) and reception matrix (50) following the second column ($S_1$) are individually activated in the scanning direction (80) one after the other. As a consequence, the entire field of vision is illuminated in a sequential scan, more precisely a horizontal scan.

Figure 4:
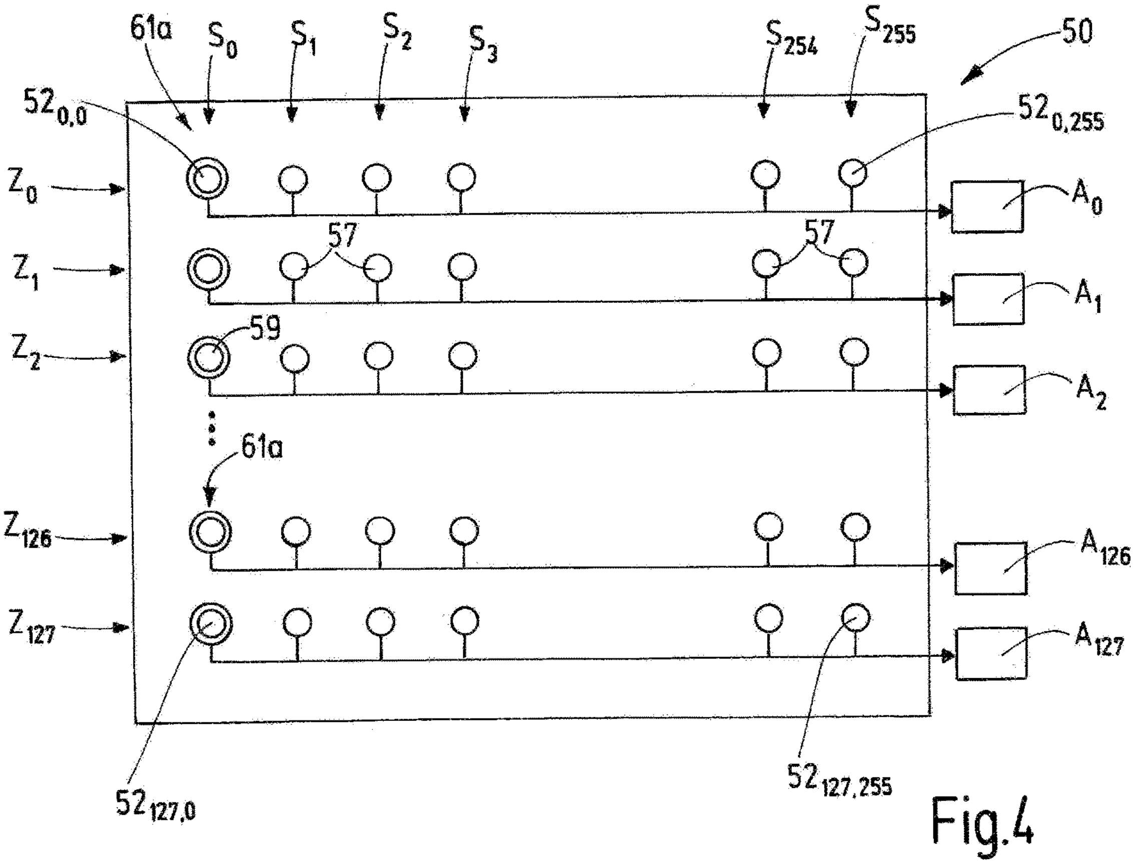
FIG. 4 is the linking of receiving elements of the reception matrix according to FIG. 3 to evaluation units.

FIG. 4 depicts the linkage of receiving elements (52$_{0,0}$ to 52$_{127,255}$) of the reception matrix (50) according to FIG. 3 to evaluation units ($A_0$ to $A_{127}$). Each row ($Z_0$ to $Z_{127}$) of the receiving elements (52$_{0,0}$ to 52$_{127,255}$) has allocated to it an evaluation unit ($A_0$ to $A_{127}$). All receiving elements of a row ($Z_0$ to $Z_{127}$) are thus linked to the same evaluation unit. The unilluminated receiving elements, more precisely elements (52$_{0,1}$ to 52$_{127,255}$) of the unilluminated submatrix, are deactivated by lowering the bias voltage. The receiving elements (52$_{0,0}$ to 52$_{127,255}$) or receiving pixels (59) are linked to the evaluation units ($A_0$ to $A_{127}$) by way of multiplexers.

Figure 5:
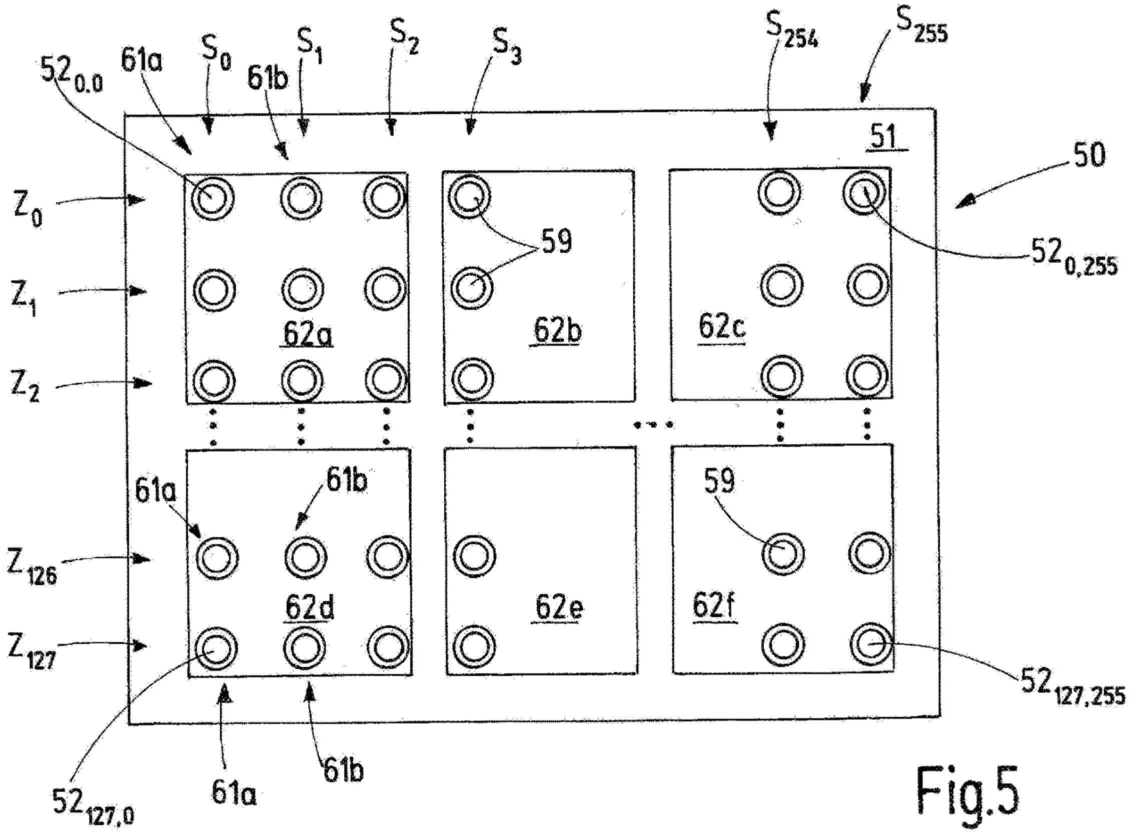
FIG. 5 is the allocation of receiving elements of the reception matrix according to FIGS. 1*b* and 2 to receiving optical systems.

FIG. 5 shows the allocation of receiving elements (52$_{0,0}$ to 52$_{127,255}$) of the reception matrix (50) according to FIGS. 1*b* and 2 to receiving optical systems. Various subsets (62*a*, 62*b*, 62*c*, 62*d*, 62*e*, 62*f*) of the receiving elements (52$_{0,0}$ to 52$_{127,255}$) have allocated to them individual receiving optical systems. The subsets (62*a*, 62*b*, 62*c*, 62*d*, 62*e*, 62*f*) form 3×3 submatrices of the reception matrix (50). The subsets (62*a*, 62*b*, 62*c*, 62*d*, 62*e*, 62*f*) do not correspond to the subsets (21*a*, 21*b*) activated for scanning.

Figure 6:
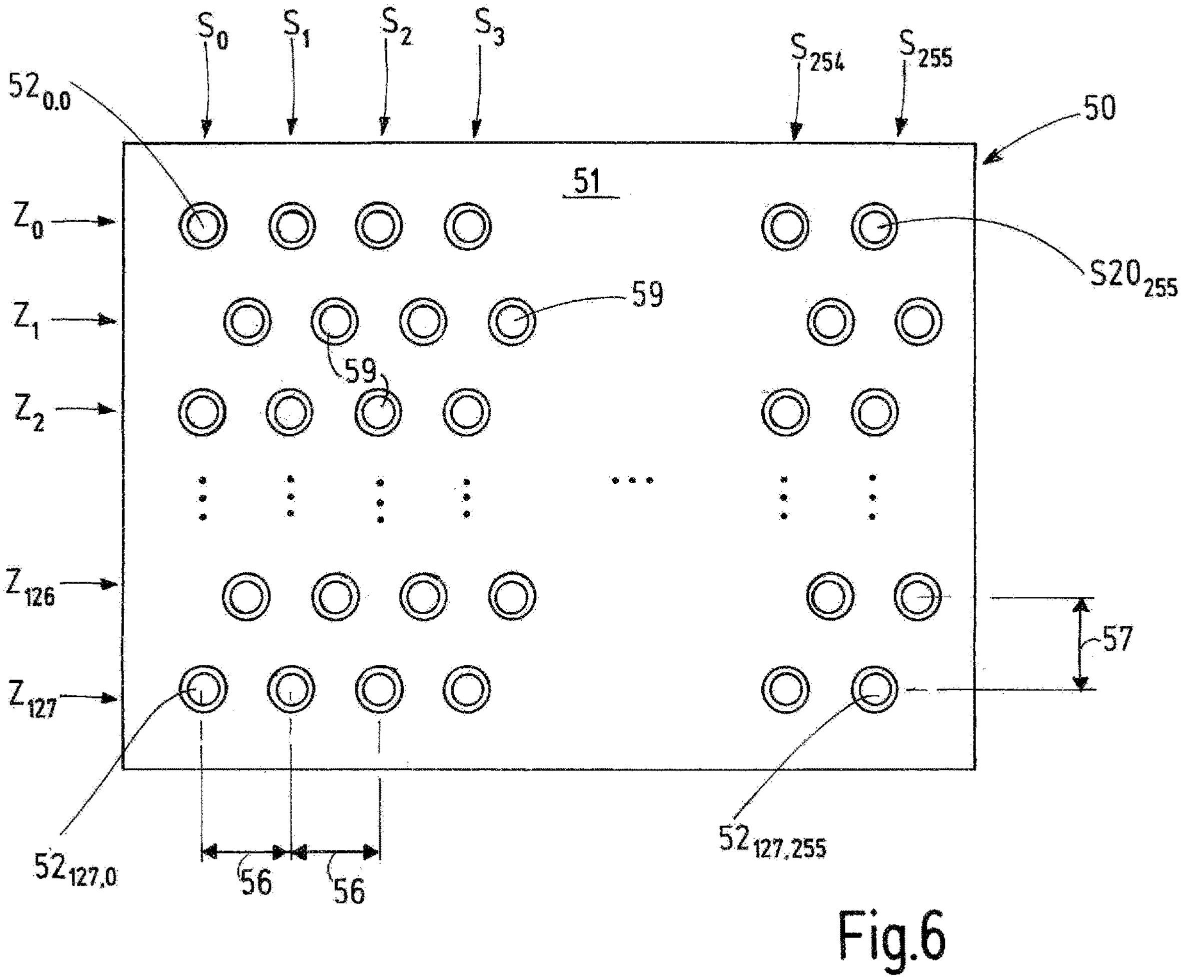
FIG. 6 is the overall illumination of the receiving elements of another reception matrix of a device according to the invention.

FIG. 6 illustrates the overall illumination of receiving elements (52$_{0,0}$ to 52$_{127,255}$) of a reception matrix (50) of a device according to the invention. A top view of one side (51) of the reception matrix (50) is shown. The relevant difference with respect to the transmission matrix (10) and reception matrix (50) described on FIGS. 1_a_, 1_b_ and 2 is that the rows ($Z_0$ to $Z_{127}$) of the transmission matrix (10) are offset by half a column spacing (16, 56) to each other, specifically the second row ($Z_1$) relative to the first row ($Z_0$) by half a column spacing (16, 56) to the right, while the third row ($Z_3$) is in turn shifted to the left by half a column spacing (16, 56). This scheme continues up to the lowermost row ($Z_{127}$). As a result of this shift, the columns ($S_0$ to $S_{255}$) do not run along a straight line, but rather along zigzag lines, as it were. The column spacing (16, 56) is here simply understood as the constant spacing between elements in a row ($Z_0$ to $Z_{127}$). The above statements also apply to the reception matrix (50).

The invention claimed is:

1. A method for optical distance measurement, wherein a plurality of measuring pulses is transmitted by at least one transmission matrix having several transmitting elements, wherein the transmitting elements are arranged in rows and columns, and wherein the rows are each offset by half a column spacing relative to an adjacent row to create a half-column row offset, wherein at least one transmitted measuring pulse is reflected by a measuring object in the form of a reflected measuring pulse, wherein the at least one measuring pulse reflected on the measuring object is received by at least one reception matrix having several receiving elements, wherein the duration of the at least one measuring pulse to the measuring object is determined, wherein the distance to the measuring object covered by the measuring pulse is determined using the speed of light, wherein the transmission matrix comprises a first subset of transmitting elements and a second subset of transmitting elements, the first subset of transmitting elements and the second subset of transmitting elements each comprising at least one transmitting element, wherein the transmitting elements of the transmission matrix are activated and/or deactivated in such a way that exclusively the first subset of transmitting elements is active at a first time, so that exclusively the at least one transmitting element allocated to the first subset of transmitting elements transmits a measuring pulse, and that exclusively the second subset of transmitting elements is active at a second time, so that exclusively the at least one transmitting element allocated to the second subset of transmitting elements transmits a measuring pulse, wherein the first subset corresponds to one column of the transmission matrix, and wherein, due to the half-column row offset, the first subset comprises transmitting elements arranged along a zigzag line.

2. The method for optical distance measurement according to claim 1, wherein the first subset and/or second subset of transmitting elements comprises a plurality of transmitting elements, wherein the transmitting elements of the first subset and/or second subset during activity simultaneously each transmit at least one measuring pulse.

3. The method for optical distance measurement according to claim 1, wherein a first subset of receiving elements comprising at least one receiving element is allocated to the first subset of transmitting elements, wherein a second subset of receiving elements comprising at least one receiving element is allocated to the second subset of transmitting elements, wherein the receiving elements in particular are activated and/or deactivated in such a way that exclusively the first subset of receiving elements is active essentially at the same time that the first subset of transmitting elements is activated, so that the first subset of receiving elements receives the reflected measuring pulses transmitted by the first subset of transmitting elements, and that exclusively the second subset of receiving elements is active essentially at the same time that the second subset of transmitting elements is activated, so that the second subset of receiving elements receives the reflected measuring pulses transmitted by the second subset of transmitting elements.

4. The method for optical distance measurement according to claim 1, wherein a receiving element of the reception matrix is allocated to each transmitting element of the transmission matrix.

5. The method for optical distance measurement according to claim 1, wherein the first subset and/or second subset of transmitting elements and/or receiving elements form a spatially correlated area of the transmission matrix or reception matrix.

6. The method for optical distance measurement according to claim 1, wherein the first subset and/or second subset of transmitting elements and/or receiving elements involves at least one row and/or at least one column and/or a submatrix of the transmission matrix or reception matrix.

7. The method according to claim 6, wherein the method comprises conducting a horizontal scan comprising activating or deactivating one column after the other as subsets of transmitting elements and/or receiving elements sequentially in ascending or descending order, or wherein the method comprises conducting a vertical scan comprising activating or deactivating one row after the other as subsets of transmitting elements and/or receiving elements sequentially in ascending or descending order.

8. The method according to claim 6, wherein the method involves determining times at which measuring pulses were received by means of a plurality of evaluation units, wherein each evaluation unit of the plurality of evaluation units is allocated to each row and/or column as subsets of receiving elements of the reception matrix respectively.

9. The method according to claim 6, wherein distances between rows and/or columns of the transmitting elements of the transmission matrix and/or of the receiving elements of the reception matrix are different in a central area than in the edge areas of the respective matrix.

10. The method for optical distance measurement according to claim 1, wherein the first subset and/or second subset of transmitting elements and/or receiving elements are spatially adjacent to each other.

11. The method for optical distance measurement according to claim 1, wherein a plurality of subsets of transmitting elements and/or receiving elements is actuated in such a way that spatially correlated and adjacent areas of the transmission matrix and/or reception matrix are activated one after the other, so that in particular the field of vision is sequentially acquired along a scanning direction.

12. The method according to claim 1, wherein all active elements not belonging to the next subset to be activated are deactivated.

13. The method according to claim 1, wherein the first subset is different from the second subset and the subsets do not overlap.

14. The method according to claim 1, wherein no movable parts are used for deflecting transmitted measuring pulses or receiving reflected measuring pulses.

15. The method according to claim 1, wherein the method does not use mechanical scanning for deflecting transmitted measuring pulses or receiving reflected measuring pulses.

16. The method according to claim 1, wherein the method is conducted by a solid-state LIDAR sensor.

17. The method according to claim 1, wherein the method comprises transmitting the measuring pulses in different directions by at least one transmission optical system.

18. The method according to claim 1, wherein the receiving elements of the reception matrix are single photon avalanche diodes.

19. The method according to claim 18, wherein a single photon triggers an avalanche effect in the diode, such that receiving a single photon results in a detection of an event, wherein events are aggregated in an event aggregator to determine the time of flight of a distance to the measuring object.

20. The method according to claim 19, wherein the event aggregator is a histogram.

21. A device for optical distance measurement, wherein the device comprises a transmission matrix with several transmitting elements for transmitting measuring pulses and a reception matrix with several receiving elements for receiving measuring pulses reflected on objects, wherein the transmitting elements are arranged in rows and columns, and wherein the rows are each offset by half a column spacing relative to an adjacent row to create a half-column row offset, wherein the transmission matrix comprises a first subset of transmitting elements and a second subset of transmitting elements, the first subset of transmitting elements and the second subset of transmitting elements each comprising at least one transmitting element, wherein the transmitting elements of the transmission matrix can be activated and/or deactivated in such a way that exclusively the first subset of transmitting elements is active at a first time, so that at least one transmitting element allocated to the first subset of transmitting elements transmits a measuring pulse, and wherein exclusively the second subset of transmitting elements is active at a second time, so that the at least one transmitting element allocated to the second subset of transmitting elements transmits a measuring pulse, wherein the first subset corresponds to one column of the transmission matrix, and wherein, due to the half-column row offset, the first subset comprises transmitting elements arranged along a zigzag line.

22. The device for optical distance measurement according to claim 21, wherein the first subset of transmitting elements has allocated to it a first subset of receiving elements comprising at least one receiving element, wherein the second subset of transmitting elements has allocated to it a second subset of receiving elements comprising at least one receiving element, wherein the receiving elements in particular can be activated and/or deactivated in such a way that exclusively the first subset of receiving elements is active essentially at the same time that the first subset of transmitting elements is activated, so that the first subset of receiving elements receives the reflected measuring pulses transmitted by the first subset of transmitting elements, and that exclusively the second subset of receiving elements is active essentially at the same time the second subset of transmitting elements is activated, so that the second subset of receiving elements receives the reflected measuring pulses transmitted by the second subset of transmitting elements.

23. The device for optical distance measurement according to claim 21, wherein the device comprises at least one transmitting optical system for transmitting the measuring pulses in different directions, wherein at least part of the transmitting elements of the transmission matrix is arranged in the focal plane of the at least one transmitting optical system, wherein the device in particular comprises at least one receiving optical system for imaging the measuring pulses on the reception matrix, wherein at least part of the receiving elements of the reception matrix is arranged in the focal plane of the at least one receiving optical system.

24. The device for optical distance measurement according to claim 21, wherein the device comprises a plurality of transmission matrices and/or reception matrices, wherein the transmission matrices and/or reception matrices each have allocated to them a transmitting optical system or receiving optical system.

25. The device for optical distance measurement according to claim 21, wherein the device is a LIDAR sensor, in particular a Flash LIDAR sensor.

26. The device for optical distance measurement according claim 25, wherein the device is a solid-state LIDAR sensor.

27. The device for optical distance measurement according to claim 21, wherein a transmitting pixel is allocated to each transmitting element, wherein a receiving pixel is allocated to each receiving element, wherein the transmitting pixels have a larger or smaller expansion than the receiving pixels.

28. The device for optical distance measurement according to claim 21, wherein the device is designed for implementing a method for optical distance measurement, the method comprising:

a plurality of measuring pulses is transmitted by at least one transmission matrix having several transmitting elements, wherein at least one transmitted measuring pulse is reflected by a measuring object in the form of a reflected measuring pulse, wherein the at least one measuring pulse reflected on the measuring object is received by at least one reception matrix having several receiving elements, wherein the duration of the at least one measuring pulse to the measuring object is determined, wherein the distance to the measuring object covered by the measuring pulse is determined using the speed of light, wherein the transmission matrix comprises a first subset of transmitting elements and a second subset of transmitting elements, each comprising at least one transmitting element, wherein the transmitting elements of the transmission matrix are activated and/or deactivated in such a way that exclusively the first subset of transmitting elements is active at a first time, so that exclusively the at least one transmitting element allocated to the first subset of transmitting elements transmits a measuring pulse, and that exclusively the second subset of transmitting elements is active at a second time, so that exclusively the at least one transmitting element allocated to the second subset of transmitting elements transmits a measuring pulse.

* * * * *